Aug. 11, 1953
H. H. FAHNOE
2,648,738
INDICATING FUSE
Filed Sept. 27, 1950
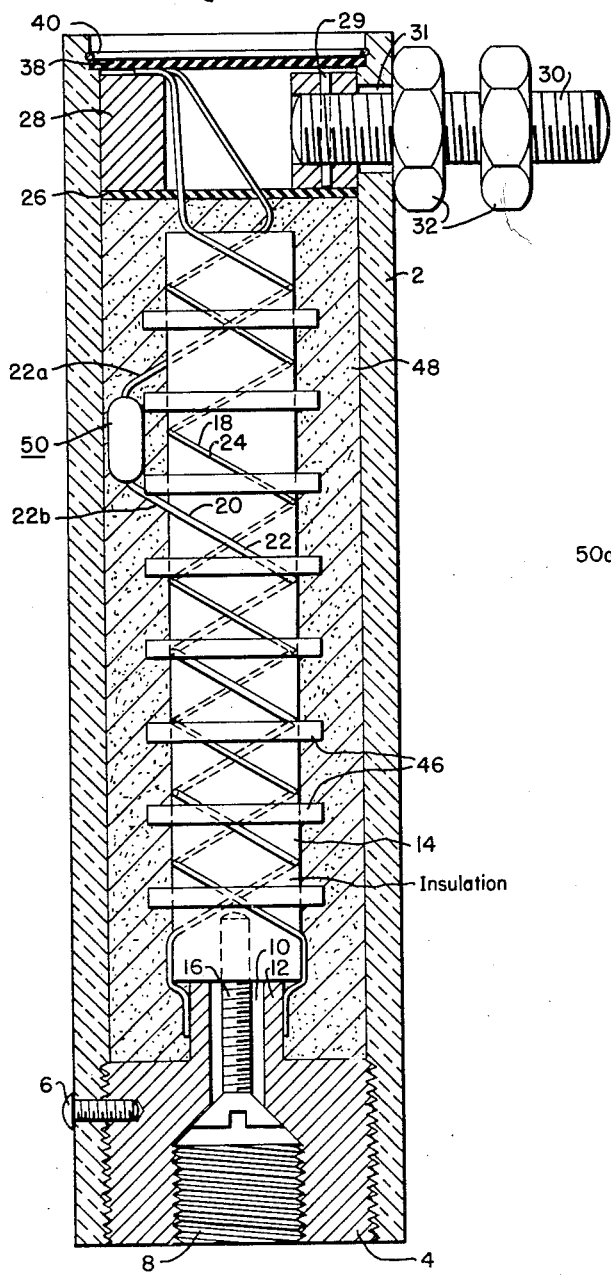
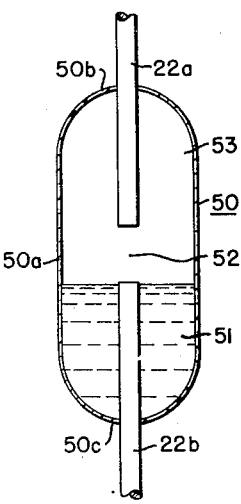
WITNESSES:
H. F. Susser.
Wm. C. Groome
INVENTOR
Harold H. Fahnoe.
BY Arthur T. Stratton
ATTORNEY Patented Aug. 11, 1953

2,648,738

UNITED STATES PATENT OFFICE 2,648,738

INDICATING FUSE

Harold H. Fahnoe, Wilkinsburg, Pa., assignor to Westinghouse Electric Corporation, East Pittsburgh, Pa., a corporation of Pennsylvania Application September 27, 1950, Serial No. 186,960

9 Claims. (Cl. 200—121)

This invention relates to electric circuit interrupters, and more particularly to interrupters of the fusible type which limit the current during circuit interruption.

When apparatus of low current rating is exposed in electrical circuit to high currents resulting from fault or other causes, the apparatus is apt to explode or suffer considerable damage. It therefore becomes important to introduce protective fuses in the circuit or circuits so that the fault current may be interrupted to save damage. Usually the fuse or fuses are replaced after proper attention is given to causes of the fault. It therefore is helpful to have visual indication at the fuse that the circuit has been exposed to overcurrent or fault of sufficient magnitude to blow the fuse, such as to give notice of fault and to simplify location of the source of fault current.

For protecting apparatus in circuit against the effects of overcurrent it often becomes important that the circuit be rapidly opened and the fault current limited. This is particularly true where high overcurrents are encountered and where the apparatus exposed is readily susceptible to damage as the result of encountering currents of more than rated value.

There are occasions where a combination of the above-mentioned needs for rapid opening and fault current limiting action and visual indication that the fuse is spent, is in order. An example of this is had where a bank of capacitors are to operate in circuits which may receive fault current. Many fuses used for the latter or like purposes, though, have been unsatisfactory for such reasons as failure to open the fault circuit with adequate rapidity and current limiting action to spare damage to the capacitor. Then, too, there are fuses which while introduced in circuits as for use with capacitors, are not capable of giving satisfactory indication that overcurrent has blown the fuse.

An object of the present invention accordingly is the provision of a fuse which, in being expended, promptly and reliably produces a safe and lasting visual indication of spent condition.

Another object of this invention is that of providing a simple, practical and reliable fuse which displays rapid circuit interrupting characteristics in the event of being exposed to overcurrent, and, when spent, visually indicates that the circuit is open.

Another object of this invention is the provision of a practical and highly useful fuse especially adapted for mounting on and protection of individual capacitor units.

A further object of this invention is to provide a simple and thoroughly reliable quick-interruption fuse for the individual protection of low current apparatus such as a capacitor, against overcurrent, the fuse being adapted to give visual indication to denote spent condition.

A still further object of the present invention is the provision of an enclosed fuse which displays quick circuit opening characteristics when exposed to overcurrent and which gives a readily observed visual indication of spent condition while the spent interior remains safely enclosed.

Another object of this invention is that of providing a simple, compact enclosed fuse which has quick circuit opening characteristics and current limiting effect on overcurrent, is capable of giving visual indication of spent condition and of maintaining a safely enclosed source of the indication after being spent.

These and other objects of the invention will become more apparent upon consideration of the following detailed description of a preferred embodiment thereof, when taken in connection with the attached drawing, in which:

Figure 1 is a longitudinal section view taken through a fuse embodying this invention with certain of the interior parts represented in elevation; and Figure 2 is an enlarged sectional view of a portion of the apparatus represented in Figure 1.

In the embodiment of the present invention represented in the accompanying drawing there is included a fuse having a tubular holder 2 made of transparent electrical insulating material, such as glass, or a transparent synthetic resin. At the lower end, the holder 2 is closed by a terminal closure plug 4, this illustratively being threaded for engaging a corresponding thread in the end of the holder, and the several parts are secured together as by a pin 6. The terminal plug 4 has a substantially centrally located tapped opening 8 which for example is threaded onto the terminal of a capacitor unit or the like, thus to give direct support by the latter. Tapped opening 8 in the closure plug 4 merges at its inner end into a passage 10 of less area in cross-section than opening 8, and this passage extends inwardly to be formed in part in a sleeve extension 12 of the closure plug.

Inside the tubular fuse holder 2 is a rod 14 of insulating material, this rod conveniently being secured in position by a screw 16 extending through passage 10 of the closure plug 4 and threadly engaging a tapped opening in the lower end of the rod. The rod 14 advantageously is of an insulating material which is capable of evolving an arc-extinguishing gas when in proximity to an electric arc, such for example, as fiber or the like, all for purposes to be described.

Rod 14 has a pair of helical slots 18 and 20 on the surface thereof, the slot 18 being adapted to receive a fuse wire 24 therein, and slot 20 being adapted to receive an overcurrent-conductive wire 22. Fuse wire 24 is of a low resistance electrical conducting material, such, for example, as silver, whereas the overcurrent-conductive wire 22 preferably is of a relatively higher resistance material such as copper-nickel alloy. Slots 18 and 20 are spaced apart and form generally parallel helical paths along the length of rod 14 and terminate at the opposite ends of the rod.

A closure disc 26 is provided in holder 2 at the upper end of rod 14 for closing off a space between the upper end of the rod and terminal plug 4. Closure disc 26 is preferably of insulating material, such as fiber, and is held in positon by a terminal collar 28, which in turn is secured in the fuse holder by a terminal screw 30 extending through an opening 31 in the side of holder 2 and having its inner end threaded into a tapped opening in terminal collar 28. The threaded screw 30 is preferably secured against rotation in collar 28 as by a pin 29 and has a pair of nuts 32 on the outer end thereof for securing a line conductor thereto. A disc 38, preferably of an insulating material such as fiber or synthetic resin, closes off the upper end of the fuse holder 2. For this purpose the upper end of the fuse holder 2 conveniently has a relatively large inside diameter to allow insertion of the disc and for holder 2 to afford a ledge or seat for the same. The disc is held in place by a split ring 40 which rests in a groove in the holder wall.

Fuse wire 24 and overcurrent conductive wire 22 are disposed in electrical parallel relation to each other across the terminal plug 4 and terminal screw 30. In this instance, for example, the lower end of fuse wire 24 and overcurrent-conductive wire 22 are secured, as by soldering or the like, to sleeve 12 on the terminal plug 4 so as to be electrically connected therewith. The upper end of the fuse wire 24 and the corresponding end of wire 22 are electrically connected with terminal screw 30, such as by soldering or the like to terminal collar 28. The closure disc 26 conveniently has two small spaced openings therethrough to afford passages for the wires 22 and 24. The space inside the holder 2 preferably is filled with a finely divided insulating material 48, such as sand, this material accordingly occupying a position between the outside longitudinal surface of rod 14 and the inside surface of the transparent wall of tubular fuse holder 2.

A closed frangible container 50 containing a dispersive indicating material 51 such as a small quantity of liquid dye, or a colored powder preferably having electrical insulating properties, is disposed inside holder 2. This container 50 conveniently is so embedded in the finely divided inert filling material 48 as to occupy a position adjacent to the inside surface of the transparent wall of holder 2, along the length of this wall and the rod 14.

In the present embodiment the container 50 is made of an electrical insulating material such as glass having a thin wall, or such as of a frangible synthetic resin, and encloses an air-gap 52 formed by adjacent ends of separate portions 22a and 22b of the overcurrent-conductive wire 22. The high resistance electrical path afforded across the fuse terminal plug 4 and terminal screw 30 through the use of the overcurrent-conductive wire 22, and the included air-gap 52, remains non-conductive during normal conditions of operation of the circuit in which the fuse is placed. For this purpose the air-gap 52 has a length sufficient to prevent passage of current during the normal circuit operation. The length of air-gap 52 is conveniently maintained by securely embedding the wire portions 22a and 22b in the wall of container 50, such as during a sealing operation or operations to prevent leakage of the dispersive indicating material from this container at the points of embedment. As shown, the upper end of wire portion 22a is electrically connected to terminal collar 28 and the lower end of wire portion 22b is connected to sleeve 12. The wire 22 accordingly interconnects terminal plug 4 and terminal screw 30 of the fuse and normally forms a high resistance path including the air-gap 52 in electrical parallel with fuse wire 24.

The dispersive indicating material 51 preferably is used in such quantity in the container 50 as to assure a clear air-gap between the adjacent gap-forming ends of portions 22a and 22b of the overcurrent-conductive wire 22, regardless of operating position of the fuse. In the embodiment illustrated, the container 50 is fixed in position by means of the overcurrent-conductive wire 22. Container 50 is oblong having a longitudinally extending cylindrical wall 50a (see Figure 2) closed off by hemispherical or dome-shaped ends 50b and 50c so as to afford a chamber 53 having inside surfaces of substantially the same general contour as the outside surface of the container. Wire portions 22a and 22b extend toward each other substantially centrally or axially of the container 50, entering through the respective domes 50b and 50c, and extend about the same distances into the chamber 53. The dispersive indicating material 51 preferably is contained in the chamber 53 in such quantity as to seek a level below the gap 52 regardless of whether the fuse is installed in the vertical position indicated in Figures 1 and 2, upside down relative to the latter position, horizontal, or is turned to substantially any other position.

During normal current supply, the fuse is conductive through terminal closure plug 4, fusible wire 24 and terminal screw 30, and the parallel path across overcurrent-conductive wire 22 and the included airgap 52 remains non-conductive. In the event of overcurrent, however, the fuse wire 24 melts and the overcurrent wire 22 becomes conductive across the included air-gap 52 long enough for the effects of the arc across the latter gap to produce rupture of the frangible container 50 with ensuing dispersion of the indicating material 51 through the surrounding finely divided insulating material 48. The dispersed colored material accordingly is visible through the transparent wall of fuse holder 2 to indicate that the fuse has blown.

The blowing of fuse wire 24, and the conducting of overcurrent by wire 22 with ensuing rupture of container 50 and dispersion of the colored material 51 all are substantially simultaneous and instantaneous operations. In substantially this same short period of time, too, the overcurrent conducting wire melts to destroy the overcurrent conductive path provided by the same and the included air-gap 52.

The particular structure described above, wherein overcurrent-conducting wire 22 and fuse wire 24 are located in slots 18 and 20, is so arranged that when these wires are melted, the resulting arc will be so confined and acted upon as to create a high enough arc voltage that the current flow at that time will be limited to a value less than the particular fault is capable of causing, and in order to interrupt the circuit before any appreciable damage to the protected device, such as a capacitor, is accomplished, this structure also is especially arranged to interrupt the circuit at the first current zero. For limiting the current in a small fraction of a half cycle in order to prevent serious damage, it will be noted that the slots 18 and 20 are made to be of substantially the same width as the wires 22 and 24 corresponding thereto. Since an arc formed within these slots would tend to blow out of the slots, a plurality of spaced washers 46 are provided along the length of rod 14 to retain correspondingly spaced portions of the arc within the slots. The washers 46 are of an insulating material, such as fiber or the like.

When the arc is struck in slot 18 or 20, the arc voltage will immediately rise at a rapid rate due to restriction of the arc cross-section in the narrow confines of the arc passage, and it will be extinguished at the first current zero by the arc-extinguishing action of the slot itself. The gases evolved from the material comprising the slot walls will be directed by the slot transversely through the arc and will then pass into the finely divided inert insulating material 48 occupying the space between rod 14 and the inner wall surface of holder 2. This transverse blast of gas effectively deionizes the arc path because it acts to sweep all metal vapor and other ionized particles in the arc path into the material 48 where it is dispersed and/or condensed in separated insulated relation. As stated above, the width of slots 18 and 20 is made as small as possible, being limited only by the diameter of the fuse wire 22, and the depth of the slots is preferably greater than the slot width, being on the order of about twice the slot width.

It is apparent from the foregoing that the fuse structure described above provides for current limitation and fast interruption of the circuit in a closed fuse especially designed for mounting on and the protection of capacitor units and the like. Moreover, this closed fuse further includes a means for giving a clear, lasting visual indication of the blowing of the fuse without interfering in any way with the efficiency of the fuse to limit the current or rapidly interrupt the circuit. It will be seen that the fuse may be entirely sealed closed, and remains closed after blowing so as not to expose the enclosed contents thereof at any time, thus giving added safety and freedom from tampering.

Having described a preferred embodiment of this invention in accordance with the Patent Statutes, it is desired that this invention be not limited to this particular embodiment inasmuch as it will be apparent, particularly to persons skilled in this art, that many modifications and changes may be made in this particular structure without departing from the broad spirit and scope of the invention. Accordingly, it is desired that the invention be interpreted as broadly as possible and that it be limited only as required by the prior art.

I claim as my invention:

1. In a fuse, a closed tubular insulating fuse holder supporting spaced terminals and including a transparent wall, fusible means in said holder and connected between said terminals, overcurrent conductor means affording a path of higher electrical resistance across said terminals than said fusible means, and frangible container means for rupture on overcurrent through said overcurrent conductor means, said container being located in said holder closely adjacent said wall and having indicating material therein which is of a distinctive color and is disposed inside said holder in the vicinity of said wall for view through said transparent wall on rupture of said container.

2. In a fuse, a closed tubular insulating fuse holder supporting spaced terminals and having a transparent wall, fusible means in said holder and connected between said terminals, overcurrent conductor means affording a path of higher electrical resistance across said terminals than said fusible means, finely divided electrically-inert material in said holder, frangible container means for rupture on overcurrent through said overcurrent conductor means, said container being located in said holder closely adjacent said wall and having distinctively colored material therein for dispersion in said finely divided, inert material adjacent said wall on rupture of said container.

3. In a fuse, a closed tubular insulating fuse holder supporting spaced terminals and including a transparent wall, a fuse wire connected between the terminals, an overcurrent conductive wire affording a high resistance air-gap across said terminals in electrical parallel with said fuse wire, finely divided inert material in said fuse holder adjacent said transparent wall, and frangible container means embedded in said inert material adjacent to said transparent wall for rupture under the effects of said air-gap being conductive on overcurrent, and said container enclosing a distinctively colored material for release to said finely divided inert material to be visible through said wall when said air-gap becomes conductive.

4. In a fuse, a closed tubular insulating fuse holder supporting spaced terminals and including a transparent wall, a fuse wire connected between said terminals, an overcurrent conductive wire affording a high resistance air-gap across said terminals in electrical parallel with said fuse wire, finely divided inert material in said fuse holder adjacent said transparent wall, and frangible container means embedded in said inert material adjacent to said transparent wall for rupture under the effects of said air-gap being conductive on overcurrent, and said container enclosing said air-gap and a distinctively colored liquid dye for release of the latter to said finely divided inert material to be visible through said wall when said air-gap becomes conductive.

5. In a fuse, a closed tubular insulating fuse holder supporting spaced terminals and including a transparent wall, means of an inert finely divided insulating material in the holder adjacent said wall, a fuse wire connected between said terminals, an overcurrent conductive wire affording a high resistance path across said terminals in electrical parallel with said fuse wire, frangible container means embedded in said inert material adjacent to said transparent wall for rupture under the effects of said overcurrent conductive wire being conductive on overcurrent, and said container enclosing a distinctively colored finely divided powder for release to said finely divided inert material to be visible through said wall when said overcurrent conductive wire becomes conductive.

6. In a fuse, a closed tubular insulating fuse holder supporting spaced terminals and including a transparent wall, means of an inert finely divided insulating material in said holder adjacent said wall, a fuse wire connected between said terminals, an overcurrent conductive wire affording a high resistance path across said terminals in electrical parallel with said fuse wire, frangible container means embedded in said inert material adjacent to said transparent wall for rupture under the effects of said overcurrent conductive wire becoming conductive on overcurrent, and said container enclosing a distinctively colored powdered insulating material for release to said finely divided inert material to be visible through said wall when said overcurrent conductive wire becomes conductive.

7. In a fuse, a closed tubular insulating fuse holder supporting spaced terminals and having a transparent wall, fusible means in said holder and connected between said terminals, overcurrent conductor means inside said fuse holder and affording a high resistance path across said terminals in electrical parallel with said fusible means, and frangible container means inside said holder adjacent said wall for rupture under the effects of said overcurrent conductor means being conductive on overcurrent, and said container enclosing a distinctively colored liquid dye for release in the vicinity of said wall when said overcurrent conductor means becomes conductive, to be visible through said wall and thus indicate the condition of the fuse.

8. In a fuse, a closed tubular insulating fuse holder supporting spaced terminals and including a transparent wall, fusible means in said holder and connected between said terminals, overcurrent conductor means inside said fuse holder and affording a high resistance path across said terminals in electrical parallel with said fusible means, and frangible container means in said holder adjacent to said transparent wall for rupture under the effects of said overcurrent conductor means becoming conductive on overcurrent, and said container enclosing a distinctively colored powder for release in the vicinity of said wall when said overcurrent conductor means becomes conductive, to be visible through said wall and thus indicate the condition of the fuse.

9. In a fuse, a closed tubular insulating fuse holder supporting spaced terminals and including a transparent wall, fusible means in said holder and connected between said terminals, overcurrent conductor means inside said fuse holder and affording a high resistance air-gap across said terminals in electrical parallel with said fusible means, frangible container means inside said holder adjacent said wall and enclosing said air-gap to rupture under the effects of the latter being conductive on overcurrent, and said container enclosing a distinctively colored powder of insulating material for release on rupture in the vicinity of said wall when said air-gap becomes conductive, to be visible through said wall and thus indicate the condition of the fuse.

HAROLD H. FAHNOE.

References Cited in the file of this patent

UNITED STATES PATENTS

| Number | Name | Date |
| --- | --- | --- |
| 948,296 | Schattner | Feb. 1, 1910 |
| 2,442,216 | Skeats | May 25, 1948 |
| 2,523,139 | Owens | Sept. 19, 1950 |